United States Patent
Noguchi et al.

(10) Patent No.: US 10,662,585 B2
(45) Date of Patent: May 26, 2020

(54) METHOD FOR PRODUCING FIBROUS CELLULOSE, AND FIBROUS CELLULOSE

(71) Applicant: OJI HOLDINGS CORPORATION, Tokyo (JP)

(72) Inventors: Yuichi Noguchi, Tokyo (JP); Ikue Homma, Tokyo (JP); Yusuke Matsubara, Tokushima (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 0 days.

(21) Appl. No.: 16/089,792

(22) PCT Filed: Mar. 30, 2017

(86) PCT No.: PCT/JP2017/013352
§ 371 (c)(1),
(2) Date: Sep. 28, 2018

(87) PCT Pub. No.: WO2017/170908
PCT Pub. Date: Oct. 5, 2017

(65) Prior Publication Data
US 2019/0127915 A1   May 2, 2019

(30) Foreign Application Priority Data
Mar. 31, 2016   (JP) ................... 2016-071161

(51) Int. Cl.
*D21H 11/18* (2006.01)
*C08B 5/00* (2006.01)
*D21H 15/02* (2006.01)
*D21H 11/04* (2006.01)

(52) U.S. Cl.
CPC .............. *D21H 11/18* (2013.01); *C08B 5/00* (2013.01); *D21H 11/04* (2013.01); *D21H 15/02* (2013.01)

(58) Field of Classification Search
USPC ..................................... 162/157.6
See application file for complete search history.

(56) References Cited

U.S. PATENT DOCUMENTS

| 8,372,764 B2 | 2/2013 | Yano et al. |
| 2016/0115249 A1 | 4/2016 | Noguchi et al. |
| 2016/0177512 A1* | 6/2016 | Kawahara .............. B32B 23/08 435/289.1 |

FOREIGN PATENT DOCUMENTS

| CN | 102822413 A | 12/2012 |
| JP | 2008-024778 A | 2/2008 |
| JP | 2008-034556 A | 2/2008 |
| JP | 2013-107927 A | 6/2013 |
| JP | 2013-127141 A | 6/2013 |
| JP | 2015-189698 A | 11/2015 |
| JP | 2017-88693 A | 5/2017 |
| JP | 6252719 B1 | 12/2017 |
| JP | 6394775 B2 | 9/2018 |
| JP | 6512356 B2 | 5/2019 |
| KR | 10-2016-0008607 A | 1/2016 |
| WO | 2013/073652 A1 | 5/2013 |
| WO | 2013-176049 A1 | 11/2013 |
| WO | 2014/185505 A1 | 11/2014 |
| WO | 2015/182438 A1 | 12/2015 |
| WO | 2016/002689 A1 | 1/2016 |
| WO | 2017/047768 A1 | 3/2017 |
| WO | 2017/141800 A1 | 8/2017 |

OTHER PUBLICATIONS

Notification of Reasons for Refusal dated Oct. 9, 2018 from the Japanese Patent Office in application No. 2018-157427.
International Search Report dated Jun. 27, 2017 for Application No. PCT/JP2017/013352.
Notification of Reasons for Refusal dated May 15, 2018 from the Japanese Patent Office in application No. 2017-230044.
Notification of Reasons for Refusal dated Jan. 16, 2018 from the Japanese Patent Office in application No. 2017-230044.
International Preliminary Report on Patentability and Translation of Written Opinion, dated Oct. 11, 2018 from the International Bureau in International application No. PCT/JP2017/013352.
Notification of Reasons for Refusal dated Feb. 1, 2019 from the Korean Intellectual Property Office in Application No. 10-2018-7031384.
Communication dated Mar. 29, 2019 from the State Intellectual Property Office of the P.R.C. in counterpart Application No. 201780021668.6.

(Continued)

*Primary Examiner* — Mark Halpern
(74) *Attorney, Agent, or Firm* — Sughrue Mion, PLLC

(57) ABSTRACT

It is an object of the present invention to provide a method for producing ultrafine fibrous cellulose, which is capable of efficiently obtaining ultrafine fibrous cellulose having phosphoric acid groups with a high yield. The present invention relates to a method for producing fibrous cellulose having a fiber width of 1000 nm or less, comprising: a (A) of introducing phosphoric acid groups into cellulose fibers to form crosslinked structures via the phosphoric acid groups, thereby obtaining crosslinked phosphorylated cellulose fibers, a (B) of breaking some or all of the crosslinked structures to obtain crosslink-broken phosphorylated cellulose fibers, and a (C) of performing a mechanical treatment on the crosslink-broken phosphorylated cellulose fibers to obtain fibrous cellulose having a fiber width of 1000 nm or less, wherein, in the (A), crosslinked structures in an amount of 0.05 mmol/g or more and 2.0 mmol/g or less are formed, and the (B) is a step of performing the hydrolysis of the crosslinked structures in an aqueous solvent with pH 3 or more.

5 Claims, 1 Drawing Sheet

(56) References Cited

OTHER PUBLICATIONS

Extended European Search Report (EESR) dated Nov. 8, 2019, from the European Patent Office in corresponding European Application No. 17775442.1.
Office Action issued from the Japanese Patent Office dated Mar. 24, 2020 in Japanese Application No. 2019-020654.

* cited by examiner

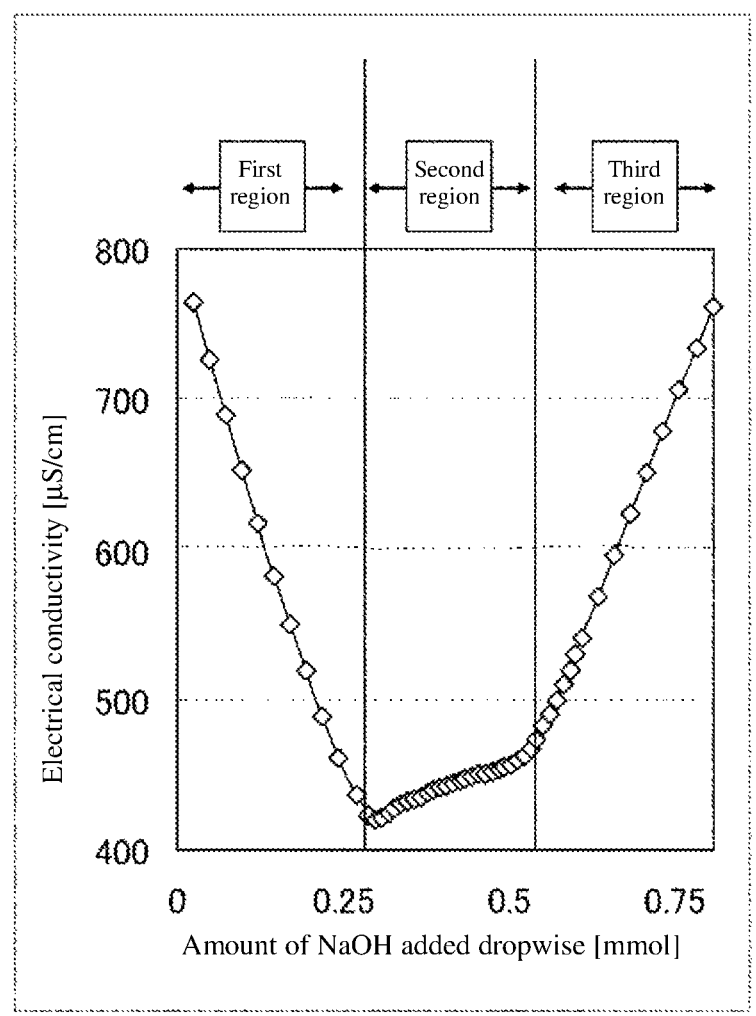

METHOD FOR PRODUCING FIBROUS CELLULOSE, AND FIBROUS CELLULOSE

CROSS REFERENCE TO RELATED APPLICATIONS

This application is a National Stage of International Application No. PCT/JP2017/013352 filed Mar. 30, 2017, claiming priority based on Japanese Patent Application No. 2016-071161 filed Mar. 31, 2016.

TECHNICAL FIELD

The present invention relates to a method for producing ultrafine fibrous cellulose, and ultrafine fibrous cellulose. Moreover, the present invention also relates to ultrafine fibrous cellulose-containing slurry and an ultrafine fibrous cellulose-containing sheet.

BACKGROUND ART

In recent years, because of enhanced awareness of alternatives to petroleum resources and environmental consciousness, there has been a focus on materials utilizing reproducible natural fibers. Among natural fibers, cellulose fibers having a fiber diameter of 10 μm or more and 50 μm or less, in particular, wood-derived cellulose fibers (pulp) have been widely used, mainly as paper products, so far.

In addition, ultrafine fibrous cellulose, which have a fiber diameter of 1 μm or less, is known as cellulose fibers. Such ultrafine fibrous cellulose can be used as a raw material for constituting a sheet or a complex. It has been known that when the ultrafine fibrous cellulose is used, the contacts of fibers are significantly increased, and thus that the tensile strength of such a sheet or a complex is significantly improved. Moreover, the use of the ultrafine fibrous cellulose in a thickener or the like has also been considered.

Ultrafine fibrous cellulose can be produced by subjecting conventional cellulose fibers to a mechanical treatment. Cellulose fibers strongly bind to one another via a hydrogen bond. Accordingly, when ultrafine fibrous cellulose is produced by simply performing a mechanical treatment on such cellulose fibers, enormous energy is required to obtain the ultrafine fibrous cellulose.

It has been known that, in order to produce ultrafine fibrous cellulose with smaller mechanical treatment energy, it is effective to perform a pre-treatment such as a chemical treatment or a biological treatment, as well as the mechanical treatment. In particular, when a hydrophilic functional group (e.g., a carboxyl group, a cation group, a phosphoric acid group, etc.) is introduced into a hydroxyl group on the surface of cellulose by a chemical treatment, electrical repulsion is generated between ions, and also the ions are hydrated, so that the dispersibility, particularly, in an aqueous solvent is significantly improved. Hence, when compared with the case of not performing a chemical treatment, energy efficiency of fibrillation is increased.

For example, Patent Documents 1 and 2 disclose phosphorylated ultrafine fibrous cellulose, in which a phosphoric acid group forms an ester with a hydroxyl group of cellulose, and a method for producing such phosphorylated ultrafine fibrous cellulose. Patent Document 2 proposes that a phosphoric acid group introduction step is carried out in the presence of urea, and that the amount of the phosphoric acid groups introduced is increased by carrying out the phosphoric acid group introduction step multiple times.

PRIOR ART DOCUMENTS

Patent Documents

Patent Document 1: International Publication No. WO 2013/073652
Patent Document 2: International Publication No. WO 2014/185505

SUMMARY OF INVENTION

Object to be Solved by the Invention

There is a case where ultrafine fibrous cellulose having phosphoric acid groups is required to comprise as many phosphoric acid groups as possible. On the other hand, ultrafine fibrous cellulose can preferably exhibit high viscosity, when it is processed into slurry. Hence, the present inventors have conducted studies for the purpose of efficiently producing such ultrafine fibrous cellulose.

Means for Solving the Object

As a result of intensive studies in order to achieve the aforementioned object, the present inventors have found that phosphorylated ultrafine fibrous cellulose, in which the amount of phosphoric acid groups introduced is sufficiently large and the formation of crosslinked structures via such phosphoric acid group is at a small level, can be efficiently obtained by a method for producing phosphorylated ultrafine fibrous cellulose, comprising forming a predetermined amount of crosslinked structure via phosphoric acid groups introduced into cellulose, then hydrolyzing the crosslinked structure, and then performing a fibrillation treatment. The present inventors have also found that when such phosphorylated ultrafine fibrous cellulose can exhibit high viscosity, when they are processed into slurry, thereby completing the present invention.

Specifically, the present invention has the following configuration.

[1] A method for producing fibrous cellulose having a fiber width of 1000 nm or less, comprising:
(A) introducing phosphoric acid groups into cellulose fibers to form crosslinked structures via the phosphoric acid groups, so as to obtain crosslinked phosphorylated cellulose fibers,
(B) breaking some or all of the crosslinked structures to obtain crosslink-broken phosphorylated cellulose fibers, and
(C) performing a mechanical treatment on the crosslink-broken phosphorylated cellulose fibers to obtain fibrous cellulose having a fiber width of 1000 nm or less, wherein
in the (A), crosslinked structures in an amount of 0.05 mmol/g or more and 2.0 mmol/g or less are formed, and
the (B) is performing the hydrolysis of the crosslinked structures in an aqueous solvent with pH 3 or more.
[2] The method for producing fibrous cellulose according to [1], wherein, in the (B), 50 mol % or more of the crosslinked structures are broken.
[3] The method for producing fibrous cellulose according to [1] or [2], wherein the (B) is a hot alkaline treatment.
[4] The method for producing fibrous cellulose according to any one of [1] to [3], wherein when the polymerization degree of the cellulose fibers before subjected to the (A) is defined as DPa and the polymerization degree of the crosslink-broken phosphorylated cellulose fibers obtained in the (B) is defined as DPb, the DPb/DPa value is 0.65 or more and 0.94 or less.

[5] The method for producing fibrous cellulose according to any one of [1] to [4], wherein the polymerization degree (DPb) of the crosslink-broken phosphorylated cellulose fibers obtained in the (B) is 600 or more.

[6] The method for producing fibrous cellulose according to any one of [1] to [5], wherein the polymerization degree (DPc) of the fibrous cellulose having a fiber width of 1000 nm or less obtained in the (C) is 390 or more.

[7] Fibrous cellulose having a fiber width of 1000 nm or less, which have phosphoric acid groups, wherein the amount of the phosphoric acid groups in the fibrous cellulose is 1.65 mmol/g or more, and the polymerization degree of the fibrous cellulose is 390 or more, and the fibrous cellulose comprise crosslinked structures formed via the phosphoric acid groups.

[8] The fibrous cellulose according to [7], wherein the content of groups having a urethane bond is 0.3 mmol/g or less.

[9] A slurry comprising the fibrous cellulose according to [7] or [8].

[10] The slurry according to [9], having a viscosity at 25° C. of 9500 mPa·s or more.

[11] A sheet comprising the fibrous cellulose according to [7] or [8].

[12] The sheet according to [11], wherein when the YI value obtained after the sheet is dried in vacuum at 200° C. for 4 hours is defined as $YI_2$, and the YI value obtained before the sheet is dried in vacuum at 200° C. for 4 hours is defined as $YI_1$, the $\Delta YI$ value represented by $YI_2-YI_1$ is 20 or less.

Advantageous Effects of Invention

According to the production method of the present invention, ultrafine fibrous cellulose having phosphoric acid groups, which can exhibit high viscosity when they are processed into slurry, can be efficiently obtained.

BRIEF DESCRIPTION OF DRAWINGS

FIG. 1 is a graph showing the relationship between the amount of NaOH added dropwise to a fiber raw material having a phosphoric acid group and electrical conductivity.

EMBODIMENTS OF CARRYING OUT THE INVENTION

Hereinafter, the present invention will be described in detail. The description for components described below will be based on representative embodiments or specific examples; however, the present invention will not be limited to such embodiments.
(Method for Producing Fibrous Cellulose)

The present invention relates to a method for producing fibrous cellulose having a fiber width of 1000 nm or less (also referred to as "ultrafine fibrous cellulose"). The method for producing fibrous cellulose of the present invention comprises a step (A) of introducing phosphoric acid groups into cellulose fibers to form crosslinked structures via the phosphoric acid groups, thereby obtaining crosslinked phosphorylated cellulose fibers, a step (B) of breaking some or all of the crosslinked structures to obtain crosslink-broken phosphorylated cellulose fibers, and a step (C) of performing a mechanical treatment on the crosslink-broken phosphorylated cellulose fibers to obtain fibrous cellulose having a fiber width of 1000 nm or less. Herein, in the step (A), crosslinked structures in an amount of 0.05 mmol/g or more and 2.0 mmol/g or less are formed. In addition, the step (B) is a step of performing the hydrolysis of the crosslinked structures in an aqueous solvent with pH 3 or more.

As described above, since the method for producing fibrous cellulose of the present invention has a step of forming crosslinked structures (step (A)), many phosphoric acid groups can be introduced into cellulose fibers. Moreover, as described above, since a crosslink-breaking step (step (B)) is performed under predetermined conditions according to the production method of the present invention, the polymerization degree of ultrafine fibrous cellulose can be kept high. Since the production method of the present invention has the aforementioned steps, ultrafine fibrous cellulose having phosphoric acid groups can be efficiently obtained with a high yield in the present invention.

In the conventional step of producing ultrafine fibrous cellulose, in order to increase the yield of ultrafine fibrous cellulose or the amount of phosphoric acid groups introduced, conditions for a phosphorylation reaction step and the like must have been restrictively controlled, and thus, the production step has tended to become complicated. In addition, in the conventional step of producing ultrafine fibrous cellulose, in order to increase the amount of phosphoric acid groups introduced, in some cases, the phosphorylation reaction step has been established multiple times. On the other hand, according to the production method of the present invention, as mentioned above, even in a case where the amount of phosphoric acid groups introduced per single phosphorylation reaction is increased, phosphorylated ultrafine fibrous cellulose, in which crosslinked structures are hardly formed via such phosphoric acid groups, can be efficiently obtained. Thereby, even in a case where only a single phosphoric acid group introduction step or a few number of phosphoric acid group introduction steps are established, the amount of phosphoric acid groups introduced into phosphorylated ultrafine fibrous cellulose can be sufficiently increased, and also, the formation of crosslinked structures via phosphoric acid groups can be suppressed. Thus, even in a case where, for example, only a single phosphoric acid group introduction step is established, phosphorylated ultrafine fibrous cellulose, in which the amount of phosphoric acid groups introduced is high and crosslinked structures are less formed, can be obtained.

Since the phosphorylated ultrafine fibrous cellulose obtained by the above-described production method comprise a sufficiently high amount of phosphoric acid groups introduced and a low level of crosslinked structure formation, fibrillation has been sufficiently carried out. Moreover, the phosphorylated ultrafine fibrous cellulose obtained by the production method of the present invention maintains a high polymerization degree. As such, the phosphorylated ultrafine fibrous cellulose can exhibit specific functions possessed by ultrafine fibrous cellulose. For example, when the ultrafine fibrous cellulose obtained by the production method of the present invention are processed into slurry, the slurry has high transparency and high viscosity. Furthermore, when the ultrafine fibrous cellulose obtained by the production method of the present invention are processed into a sheet, the sheet can exhibit excellent mechanical strength.

Further, when the ultrafine fibrous cellulose obtained by the production method of the present invention are processed into a sheet, the sheet can exhibit excellent yellowing resistance. This is considered mainly because the amount of groups having a urethane bond introduced into the ultrafine fibrous cellulose obtained by the method for producing fibrous cellulose of the present invention is suppressed.

When phosphoric acid groups are introduced into cellulose fibers in the step (A), there is a case where urea and/or a derivative thereof are used as a phosphorylating agent, as well as a compound having a phosphoric acid group. In this case, as a group derived from urea and/or a derivative thereof, a group having a urethane bond is introduced into cellulose.

In the method for producing fibrous cellulose of the present invention, the amount of groups having a urethane bond introduced can also be suppressed. For example, the amount of groups having a urethane bond introduced can be controlled by performing the step (B) under alkaline conditions in the production method of the present invention. In the method for producing fibrous cellulose of the present invention, it is preferable to obtain ultrafine fibrous cellulose, in which the content of groups having a urethane bond is 0.3 mmol/g or less based on 1 g of ultrafine fibrous cellulose. In such a case, the ultrafine fibrous cellulose obtained in the present invention can also exhibit excellent yellowing resistance. For example, even in a case where the ultrafine fibrous cellulose of the present invention is processed into a sheet and the sheet is then heated, an increase in the yellowness (YI value) of the sheet is suppressed.

<Step (A)>

The step (A) is a step of introducing phosphoric acid groups into cellulose fibers to form crosslinked structures via the phosphoric acid groups, so as to obtain crosslinked phosphorylated cellulose fibers. The step (A) is a step of obtaining crosslinked phosphorylated cellulose fibers, and in the crosslinked phosphorylated cellulose fibers, crosslinked structures in an amount of 0.05 mmol/g or more and 2.0 mmol/g or less are formed.

The step (A) may be composed of two steps, namely, a step (a1) of introducing phosphoric acid groups into cellulose fibers, and a step (a2) of forming crosslinked structures via the phosphoric acid groups to obtain crosslinked phosphorylated cellulose fibers, and also, the heat treatment step in the step (a1) of introducing phosphoric acid groups may serve both as a step (a1) and as a step (a2).

The step (a1) of introducing phosphoric acid groups into cellulose fibers (hereinafter, also referred to as a "phosphoric acid group introduction step") can be carried out by allowing a fiber raw material comprising cellulose to react with at least one selected from a compound having a phosphoric acid group and a salt thereof (hereinafter, referred to as a "phosphorylating reagent" or "compound A"). Such a phosphorylating reagent may be mixed into the fiber raw material that is in a dry or wet state, in the form of a powder or a solution. In another example, a powder or a solution of the phosphorylating reagent may be added into slurry of the fiber raw material.

The phosphoric acid group introduction step may be performed by allowing at least one selected from a compound having a phosphoric acid group and a salt thereof (a phosphorylating reagent or compound A) to react with a fiber raw material comprising cellulose. It is to be noted that this reaction may be performed in the presence of at least one selected from urea and a derivative thereof (hereinafter, referred to as "compound B").

One example of the method of allowing compound A to act on the fiber raw material in the presence of compound B may be a method of mixing the fiber raw material that is in a dry or wet state with a powder or a solution of compound A and compound B. Another example thereof may be a method of adding a powder or a solution of compound A and compound B to slurry of the fiber raw material. Among them, a method of adding a solution of compound A and compound B to the fiber raw material in a dry state, or a method of adding a powder or a solution of compound A and compound B to the fiber raw material in a wet state is preferable because of the high homogeneity of the reaction. Compound A and compound B may be added at the same time or may be added separately. Alternatively, compound A and compound B to be subjected to the reaction may be first added as a solution, which is then compressed to squeeze out redundant chemicals. The form of the fiber raw material is preferably a cotton-like or thin sheet form, but is not particularly limited thereto.

Compound A used in the present embodiment is a compound containing a phosphorus atom and being capable of forming an ester bond with cellulose. Examples of such a compound containing a phosphorus atom and being capable of forming an ester bond with cellulose include at least one selected from phosphoric acid, a salt of phosphoric acid, a dehydrated condensate of phosphoric acid, a salt of dehydrated condensate of phosphoric acid, phosphorus pentoxide and phosphorus oxychloride, or a mixture thereof, but are not particularly limited thereto. Such a compound may contain water in the form of hydrated water or the like, or may also be an anhydride essentially containing no water.

A phosphate or a salt of dehydrated condensate of phosphoric acid can be selected from the lithium salt, sodium salt, potassium salt, ammonium salt, organic ammonium salt, and organic phosphonium salt of phosphoric acid or dehydrated condensate of phosphoric acid, and a salt formed with any given compound exhibiting basicity, but examples of such a phosphate or a salt of dehydrated condensate of phosphoric acid are not particularly limited thereto.

Moreover, the degree of neutralization of such a phosphate or a salt of dehydrated condensate of phosphoric acid is not particularly limited, either.

Among these, from the viewpoint of high efficiency of introduction of phosphoric acid groups, defibration efficiency that is easily improved in the after-mentioned defibration step, low costs, and high industrial applicability, phosphoric acid, a sodium salt of phosphoric acid, a potassium salt of phosphoric acid, or an ammonium salt of phosphoric acid is preferable. Moreover, phosphoric acid, ammonium dihydrogen phosphate, or sodium dihydrogen phosphate is more preferable.

Further, since the uniformity of the reaction is improved and the efficiency in introduction of phosphoric acid groups is enhanced, the compound A is preferably used as a solution. Although there is no particular restriction on the pH of a solution of the compound A, the pH is preferably pH 7 or lower because the efficiency in introduction of phosphoric acid groups becomes high, and more preferably pH 3 or more and 7 or less from the viewpoint of suppression of the hydrolysis of a pulp fiber. The pH of a solution of the compound A may be adjusted, for example, by using, among compounds having phosphoric acid groups, a combination of an acidic one and an alkaline one, and changing the amount ratio thereof. The pH of a solution of compound A may also be adjusted by adding an inorganic alkali or an organic alkali to an acidic compound among compounds having phosphoric acid groups.

Although there is no particular restriction on the amount of the compound A added to a fiber raw material, if the amount of the compound A added is converted to a phosphorus atomic weight, the amount of phosphorus atoms added with respect to the fiber raw material (absolute dry mass) is preferably 0.5% by mass or more and 100% by mass or less, more preferably 1% by mass or more and 50% by mass or less, and most preferably 2% by mass or more and 30% by mass or less. When the amount of phosphorus atoms added to the fiber raw material is within the above-described range, the yield of ultrafine fibrous cellulose may be further improved. Moreover, the cost of the compound A used can be reduced by setting the amount of phosphorus atoms added to the fiber raw material at the above-described upper limit value or less. On the other hand, by setting the amount of phosphorus atoms added to the fiber raw material at the above-described lower limit value or more, the yield can be increased.

Examples of the compound B used in the present embodiment include urea, biuret, 1-phenyl urea, 1-benzyl urea, 1-methyl urea, and 1-ethyl urea.

Compound B, as with the compound A, is preferably used as a solution. A solution containing both the compound A and the compound B dissolved therein is preferably used because of the enhanced homogeneity of the reaction. The amount of the compound B added to the fiber raw material (absolute dry mass) is preferably 1% by mass or more and 500% by mass or less, more preferably 10% by mass or more and 400% by mass or less, further preferably 100% by mass or more and 350% by mass or less, and particularly preferably 150% by mass or more and 300% by mass or less.

The reaction system may comprise an amide or an amine in addition to the compound A and the compound B. Examples of the amide include formamide, dimethylformamide, acetamide, and dimethylacetamide. Examples of the amine include methylamine, ethylamine, trimethylamine, triethylamine, monoethanolamine, diethanolamine, triethanolamine, pyridine, ethylenediamine, and hexamethylenediamine. Among them, particularly, triethylamine is known to work as a favorable reaction catalyst.

In the phosphoric acid group introduction step, it is preferable to perform a heat treatment. For the temperature of the heat treatment, it is preferable to select a temperature that allows an efficient introduction of phosphoric acid groups, while suppressing thermal decomposition or hydrolysis reaction of fibers. Specifically, the temperature is preferably 50° C. or higher and 300° C. or lower, more preferably 100° C. or higher and 250° C. or lower, and further preferably 130° C. or higher and 200° C. or lower. In addition, a vacuum dryer, an infrared heating device, or a microwave heating device may be used for heating.

Upon the heat treatment, if the time for leaving the fiber raw material at rest is prolonged while the fiber raw material slurry to which the compound A is added contains water, as drying advances, water molecules and the compound A dissolved therein move to the surface of the fiber raw material. As such, there is a possibility of the occurrence of unevenness in the concentration of the compound A in the fiber raw material, and the introduction of phosphoric acid groups to the fiber surface may not progress uniformly. In order to suppress the occurrence of unevenness in the concentration of the compound A in the fiber raw material due to drying, the fiber raw material in the shape of a very thin sheet may be used, or a method of heat-drying or vacuum-drying the fiber raw material, while kneading or stirring with the compound A using a kneader or the like, may be employed.

As a heating device used for heat treatment, a device capable of always discharging moisture retained by slurry or moisture generated by an addition reaction of phosphoric acid groups with hydroxy groups of the fiber to the outside of the device system is preferable, and for example, forced convection ovens or the like are preferable. By always discharging moisture in the device system, in addition to being able to suppress a hydrolysis reaction of phosphoric acid ester bonds, which is a reverse reaction of the phosphoric acid esterification, acid hydrolysis of sugar chains in the fiber may be suppressed as well, and ultrafine fibers with a high axial ratio can be obtained.

The time for heat treatment is, although it also depends on the heating temperature, preferably 1 second or more and 300 minutes or less, more preferably 1 second or more and 1000 seconds or less, and further preferably 10 seconds or more and 800 seconds or less, after moisture is substantially removed from the fiber raw material slurry. In the present invention, by setting the heating temperature and heating time within an appropriate range, the amount of phosphoric acid groups introduced can be set within a preferred range.

The aforementioned phosphoric acid group introduction step may be carried out at least once, but may also be repeatedly carried out multiple times. For example, it is possible to establish the phosphoric acid group introduction step two times or more and four times or less. However, in the method for producing ultrafine fibrous cellulose of the present invention, even in a case where the aforementioned phosphoric acid group introduction step is carried out only once or twice, the amount of phosphoric acid groups introduced can be sufficiently increased, and the formation of crosslinked structures via phosphoric acid groups can be suppressed. Hence, in the present invention, even in a case where a sufficient amount of phosphoric acid groups are introduced, the phosphoric acid group introduction step can be carried out at a small number of times such as once or twice, and thus, an efficient production process can be realized. From the viewpoint of carrying out a more efficient production process, it is preferable to establish the phosphoric acid group introduction step only once.

When the phosphoric acid group introduction step is carried out multiple times, a washing step or an alkaline treatment step may be established between individual phosphoric acid group introduction steps. Moreover, when the phosphoric acid group introduction step is carried out multiple times, the after-mentioned step (a2) is preferably carried out, following the final phosphoric acid group introduction step (a1).

After the phosphoric acid group introduction step (a1), a step (a2) of forming crosslinked structures via phosphoric acid groups to obtain crosslinked phosphorylated cellulose fibers is established. It is to be noted that the step (a2) may also be incorporated into the heat treatment step in the step (a1).

The step (a2) is preferably a heat treatment step. The heating temperature applied in such a heat treatment step is preferably 50° C. or higher and 300° C. or lower, more preferably 100° C. or higher and 250° C. or lower, and further preferably 130° C. or higher and 200° C. or lower. Moreover, the heating time applied in the heat treatment step is preferably 1 second or more and 300 minutes or less, more preferably 1 second or more and 1000 seconds or less, and further preferably 10 seconds or more and 800 seconds or less.

In the heat treatment step, it is preferable to use, for example, a vacuum dryer, an infrared heating device, or a microwave heating device.

The heat treatment step as a step (a2) is preferably carried out continuously after the heat treatment in the aforementioned step (a1) that is a phosphoric acid group introduction step. Thereby, energy efficiency can be enhanced in the step of producing ultrafine fibrous cellulose. When the heat treatment step (a2) is carried out continuously after the heat treatment in the step (a1), for example, the heating time can be prolonged while the heat treatment temperature applied in the step (a1) is kept as is. Moreover, by prolonging the heat treatment time in the step (a1), the step (a2) can be substantially incorporated into the step (a1). Besides, even in a case where the heat treatment step (a2) is carried out continuously after the heat treatment in the step (a1), the heating temperatures applied in the two steps may be set at different temperatures from each other.

The amount of phosphoric acid groups contained in the crosslinked phosphorylated cellulose fibers obtained via the step (a1) of introducing phosphoric acid groups and the step (a2) of obtaining crosslinked phosphorylated cellulose fibers is preferably 0.5 mmol/g or more, more preferably 1.0 mmol/g or more, and further preferably 1.6 mmol/g or more. On the other hand, the amount of phosphoric acid groups in ultrafine fibrous cellulose is preferably 5.0 mmol/g or less.

The amount of phosphoric acid groups introduced can be measured by a conductometric titration method. Specifically, the amount introduced can be measured by treating the obtained cellulose-containing slurry with an ion exchange resin, and then examining a change in the electrical conductivity while adding a sodium hydroxide aqueous solution.

The conductometric titration confers a curve shown in FIG. 1 as an alkali is added. First, the electrical conductivity is rapidly reduced (hereinafter, this region is referred to as a "first region"). Then, the conductivity starts rising slightly (hereinafter, this region is referred to as a "second region"). Then, the increment of the conductivity is increased (hereinafter, this region is referred to as a "third region"). In short, three regions appear. Besides, the boundary point between the second region and the third region is defined as a point at which the secondary differential value of conductivity, that is, the change in the increment (gradient) of conductivity becomes maximum. Among them, the amount of the alkali required for the first region among these regions is equal to the amount of a strongly acidic group in the slurry used in the titration, and the amount of the alkali required for the second region is equal to the amount of a weakly acidic group in the slurry used in the titration. When condensation of a phosphoric acid group occurs, the weakly acidic group is apparently lost, so that the amount of the alkali required for the second region is decreased as compared with the amount of the alkali required for the first region. On the other hand, the amount of the strongly acidic group agrees with the amount of the phosphorus atom regardless of the presence or absence of condensation. Therefore, the simple term "the amount of the phosphoric acid group introduced (or the amount of the phosphoric acid group)" or "the amount of the substituent introduced (or the amount of the substituent)" refers to the amount of the strongly acidic group. That is to say, the amount (mmol) of the alkali required for the first region in the curve shown in FIG. 1 is divided by the solid content (g) in the slurry as a titration target to obtain the amount (mmol/g) of the phosphoric acid group introduced.

Through the above-described step (A), crosslinked phosphorylated cellulose fibers are obtained. In the crosslinked phosphorylated cellulose fibers, crosslinked structures are formed in an amount of 0.05 mmol/g or more and 2.0 mmol/g or less. The amount of such crosslinked structures is preferably 0.10 mmol/g or more and 1.5 mmol/g or less, and more preferably 0.13 mmol/g or more and 1.0 mmol/g or less.

Herein, it is considered that the crosslinked structures are formed as a result of dehydration condensation performed by phosphoric acid groups that have been introduced into cellulose fibers. That is, it is a structure in which a glucose unit of cellulose binds to each of two P atoms of pyrophosphoric acid via an O atom. Accordingly, if crosslinked phosphoric acid groups are formed, weakly acidic groups are apparently lost, and as a result, the amount of alkali necessary for the second region is reduced in comparison to the amount of alkali necessary for the first region in FIG. 1. That is, the amount of the crosslinked structures is a value obtained by dividing a difference between the amount of alkali necessary for the first region and the amount of alkali necessary for the second region by 2.

<Step (B)>

The step (B) is a step of breaking some or all of the crosslinked structures to obtain crosslink-broken phosphorylated cellulose fibers. In the step (B), hydrolysis is carried out to break some or all of the crosslinked structures formed in the step (A). In the step (B), the crosslinked structures are hydrolyzed in an aqueous solvent with pH 3 or more. The above-described aqueous solvent is a solvent comprising at least water, and a pH adjuster and the like. This aqueous solvent is added to the crosslinked phosphorylated cellulose fibers obtained in the step (A), so as to carry out hydrolysis.

In the step (B), the pH of a mixture of an aqueous solvent and crosslinked phosphorylated cellulose fibers, which are to be subjected to hydrolysis (hereinafter also referred to as a "solvent mixture") may be 3 or more, preferably 4 or more, more preferably 6 or more, and further preferably 7 or more. In particular, the solvent mixture is preferably an alkaline mixture, and it is preferably a solvent mixture having pH of more than 7. The pH of the solvent mixture is further preferably 8 or more, and particularly preferably 9 or more. The upper limit of the pH of the solvent mixture is not particularly limited, and it may be pH 14. In order to adjust the pH of the aqueous solvent within a desired range, for example, a pH adjuster such as hydrochloric acid or sodium hydroxide is added to water to have a desired pH value.

Upon performing hydrolysis in the step (B), the solvent mixture is preferably heated. The temperature of a mixture of an aqueous solvent and crosslinked phosphorylated cellulose fibers (a solvent mixture) placed in a reaction vessel to be subjected to hydrolysis (hereinafter also referred to as a "internal temperature") is preferably 40° C. or higher, more preferably 50° C. or higher, further preferably 60° C. or higher, still further preferably 70° C. or higher, and particularly preferably 80° C. or higher.

As mentioned above, the step (B) in the present invention is preferably a hot alkaline treatment step. In the present description, the "hot alkaline treatment step" is a treatment step of heating an aqueous solvent with a pH value of more than 7 to 80° C. or higher.

In the step (B), preferably 50 mol % or more of, more preferably 55 mol % or more of, and further preferably 60 mol % or more of the crosslinked structures are broken. On the other hand, in the step (B), 99 mol % or less of the crosslinked structures are preferably broken, based on the total number thereof.

The amount of the crosslinked structures in the crosslink-broken phosphorylated cellulose fibers obtained in the step (B) is preferably 0.10 mmol/g or less, and more preferably 0.05 mmol/g or less. On the other hand, the amount of the crosslinked structures in the crosslink-broken phosphorylated cellulose fibers may be 0 mmol/g or more, or may also be 0.003 mmol/g or more.

In the step (B), the crosslinked phosphorylated cellulose fibers obtained in the step (A) are converted to crosslink-broken phosphorylated cellulose fibers by being subjected to the aforementioned hydrolysis treatment step. The present invention is also characterized in that the polymerization degree of the crosslink-broken phosphorylated cellulose fibers can be controlled to be within a predetermined range by performing the step (B) under the above-described conditions. That is to say, in the crosslink-broken phosphorylated cellulose fibers obtained in the step (B) of the present invention, it is preferable that the crosslink be broken but the polymerization degree be maintained within a predetermined range. The polymerization degree (DPb) of the crosslink-broken phosphorylated cellulose fibers is preferably 600 or more, more preferably 650 or more, and further preferably 700 or more. On the other hand, the polymerization degree (DPb) of the crosslink-broken phosphorylated cellulose fibers is preferably 1500 or less, and more preferably 880 or less.

When the polymerization degree of cellulose fibers before subjected to the step (A) is defined as DPa and the polymerization degree of the crosslink-broken phosphorylated cellulose fibers obtained in the step (B) is defined as DPb, the value of DPb/DPa is preferably 0.65 or more, more preferably 0.70 or more, and further preferably 0.75 or more. On the other hand, the DPb/DPa value is preferably 1.5 or less, and more preferably 0.94 or less.

The polymerization degree of the crosslink-broken phosphorylated cellulose fibers obtained in the step (B) and the polymerization degree of the cellulose fibers before subjected to the step (A) are values calculated from the viscosity of pulp, which is measured according to Tappi T230. Specifically, the cellulose fibers as a measurement target are dispersed in an aqueous solution of copper ethylenediamine, and the viscosity thereof is then measured (defined as $\eta 1$). At the same time, a blank viscosity (defined as $\eta 0$) is measured using only a dispersion medium. Thereafter, a specific viscosity ($\eta sp$) and an intrinsic viscosity ($[\eta]$) are measured according to the following equations.

$$\eta sp = (\eta 1 / \eta 0) - 1$$

$$[\eta] = \eta sp / (c(1 + 0.28 \times \eta sp))$$

In the above equations, c indicates the concentration of cellulose fibers at the time of measuring the viscosity.

Then, the polymerization degree (DP) is calculated according to the following equation.

$$DP = 1.75 \times [\eta]$$

Since this polymerization degree is an average polymerization degree measured according to viscometry, it is also referred to as a "viscosity average polymerization degree."

<Step (C)>

Step (C) is a step of performing a mechanical treatment on the crosslink-broken phosphorylated cellulose fibers to obtain fibrous cellulose having a fiber width of 1000 nm or less. Such a mechanical treatment step is also referred to as a defibration treatment step. In the present invention, since the crosslinked structures are broken in the aforementioned step (B), only small energy is needed for the defibration treatment in the step (C), and thus, the production cost can be reduced.

In the mechanical treatment step, fibers are defibrated usually using a defibration treatment apparatus to obtain slurry containing ultrafine fibrous cellulose, and there is no particular restriction on a treatment apparatus, or a treatment method.

Examples of the defibration treatment apparatus that can be used herein include a high-speed defibrator, a grinder (stone mill-type crusher), a high-pressure homogenizer, an ultrahigh-pressure homogenizer, a high-pressure collision-type crusher, a ball mill, and a bead mill. Alternatively, for example, a wet milling apparatus such as a disc-type refiner, a conical refiner, a twin-screw kneader, an oscillation mill, a homomixer under high-speed rotation, an ultrasonic disperser, or a beater may also be used as such a defibration treatment apparatus. The defibration treatment apparatus is not limited to the above. Examples of a preferred defibration treatment method include a high-speed defibrator, a high-pressure homogenizer, and an ultrahigh-pressure homogenizer, which are less affected by milling media, and are free from apprehension of contamination.

Upon the mechanical treatment, the crosslink-broken phosphorylated cellulose fibers obtained in the step (B) are preferably diluted with water and an organic solvent each alone or in combination, to prepare slurry, but the method is not particularly limited thereto. Water as well as a polar organic solvent can be used as a dispersion medium. Preferred examples of the polar organic solvent include, but are not particularly limited to, alcohols, ketones, ethers, dimethyl sulfoxide (DMSO), dimethylformamide (DMF), and dimethylacetamide (DMAc). Examples of the alcohols include methanol, ethanol, n-propanol, isopropanol, n-butanol, and t-butyl alcohol. Examples of the ketones include acetone and methyl ethyl ketone (MEK). Examples of the ethers include diethyl ether and tetrahydrofuran (THF). One of these dispersion media may be used, or two or more thereof may be used. The dispersion medium may also contain a solid content other than the fiber raw material, for example, hydrogen-binding urea.

Through the mechanical treatment, fibrous cellulose having a fiber width of 1000 nm or less (ultrafine fibrous cellulose) is obtained. In the present invention, slurry containing such ultrafine fibrous cellulose may be once concentrated and/or dried, and may be then subjected to a mechanical treatment again. In this case, there is no particular restriction on the method of concentration and drying, and examples thereof include a method in which a concentrating agent is added into slurry containing ultrafine fibrous cellulose, and a method using a dehydrator, a press, a dryer, and the like used generally. Further, publicly known methods, for example as described in WO 2014/024876, WO 2012/107642, and WO 2013/121086, may be used. Also, the ultrafine fibrous cellulose-containing slurry is concentrated and dried by forming a sheet from the slurry, and a mechanical treatment is then carried out on the sheet, so that the ultrafine fibrous cellulose-containing slurry can be obtained again.

As an apparatus used for defibrating (pulverizing) again the ultrafine fibrous cellulose-containing slurry after it has been concentrated and/or dried, a high-speed defibrator, a grinder (stone mill-type grinder), a high-pressure homogenizer, an ultra-high pressure homogenizer, a high-pressure collision type crusher, a ball mill, a bead mill, a disk type refiner, a conical refiner, a twin screw kneader, a vibrating mill, a device for wet milling, such as a high-speed rotating homomixer, an ultrasonic disperser, and a beater may be used, but examples of the apparatus are not particularly limited thereto.

In the step (C), ultrafine fibrous cellulose having phosphoric acid groups is obtained. The ultrafine fibrous cellulose is preferably obtained in the form of slurry, but it may also be obtained as a particulate. In this case, after the step (C), a concentration step, a drying step and the like may be established, as appropriate.

The polymerization degree of the fibrous cellulose having a fiber width of 1000 nm or less (ultrafine fibrous cellulose) obtained in the step (C) is preferably 390 or more, and more preferably 400 or more. On the other hand, the polymerization degree of the fibrous cellulose is preferably 1000 or less, and more preferably 450 or less.

The above-described polymerization degree of the ultrafine fibrous cellulose can be calculated by the same method as the aforementioned method of measuring the polymerization degree of the cellulose fibers obtained in the step (B).

<Other Steps>

The aforementioned phosphoric acid group introduction step (a1) in the step (A) is preferably carried out only once, but the step (a1) may also be repeated multiple times. In this case, a washing step or an alkaline treatment step may be established between individual phosphoric acid group introduction steps. Moreover, such a washing step or an alkaline treatment step may also be established between the aforementioned step (A) and step (B).

The washing step can be carried out by repeatedly performing an operation of pouring ion exchange water onto the cellulose fibers obtained in the step before the washing step, then stirring the solution to uniformly disperse the cellulose fibers therein, and then performing filtration and dehydration to obtain a dehydrated sheet. By establishing such a washing step, redundant drug solution or impurities contained in the cellulose fibers obtained in the step before the washing step can be removed from the cellulose fibers.

The alkaline treatment method in the alkaline treatment step is not particularly limited. For example, a method of immersing cellulose fibers in an alkaline solution may be applied.

The alkaline compound contained in the alkaline solution is not particularly limited, and it may be either an inorganic alkaline compound or an organic alkaline compound. The solvent in the alkaline solution may be either water or an organic solvent. The solvent is preferably a polar solvent (water, or a polar organic solvent such as alcohol), and more preferably an aqueous solvent containing at least water.

Among alkaline solutions, a sodium hydroxide aqueous solution, or a potassium hydroxide aqueous solution is particularly preferable because of their multiplicity of uses.

The temperature of the alkaline solution in the alkaline treatment step is not particularly limited, and it is preferably 5° C. or higher and 80° C. or lower, and more preferably 10° C. or higher and 60° C. or lower.

The time required for immersion of cellulose fibers in the alkaline solution in the alkaline treatment step is not particularly limited, and it is preferably 5 minutes or more and 30 minutes or less, and more preferably 10 minutes or more and 20 minutes or less.

The amount of the alkaline solution used in the alkaline treatment is not particularly limited, and it is preferably 100% by mass or more and 100000% by mass or less, and more preferably 1000% by mass or more and 10000% by mass or less, based on the absolute dry mass of the cellulose fibers.

In order to reduce the amount of the alkaline solution used in the alkali treatment step, a washing step as described above may be preferably established before the alkaline treatment step. Moreover, after completion of the alkaline treatment, the alkali-treated cellulose fibers are preferably washed with water or an organic solvent, in order to improve handling ability.

(Fibrous Cellulose)

The present invention relates to fibrous cellulose with a fiber width of 1000 nm or less (also referred to as "ultrafine fibrous cellulose") having phosphoric acid groups, which is produced by the aforementioned production method. The amount of phosphoric acid groups contained in the ultrafine fibrous cellulose of the present invention is preferably 1.65 mmol/g or more, and the polymerization degree of the ultrafine fibrous cellulose is preferably 390 or more. In addition, in the ultrafine fibrous cellulose of the present invention, the formation of crosslinked structures via phosphoric acid groups is reduced, but at least some crosslinked structures remain in the ultrafine fibrous cellulose. Hence, the ultrafine fibrous cellulose of the present invention comprises crosslinked structures formed via phosphoric acid groups.

In the prior art, there has been a case where crosslinked structures are formed via phosphoric acid groups, when many phosphoric acid groups are introduced. There have been concerns over an increase in the number of such crosslinked structures, which would cause inhibition of the fibrillation of fibrous cellulose. Meanwhile, when the number of crosslinked structures formed via phosphoric acid groups intends to be reduced while increasing the amount of phosphoric acid groups introduced, the polymerization degree of phosphorylated ultrafine fibrous cellulose tends to be decreased. As a result, there has been a case where ultrafine fibrous cellulose having such a small polymerization degree hardly exhibit desired physical properties.

The present invention has been made to solve the aforementioned problems, and even if the amount of phosphoric acid introduced is large, the polymerization degree of phosphorylated ultrafine fibrous cellulose can be kept at a predetermined value or more. Furthermore, in the ultrafine fibrous cellulose of the present invention, even if the amount of phosphoric acid introduced is large, the number of crosslinked structures is controlled to be small. Fibrillation is favorably done in such ultrafine fibrous cellulose, and when the ultrafine fibrous cellulose is processed into, for example, slurry, the slurry can exhibit high viscosity.

The fibrous cellulose raw material for obtaining ultrafine fibrous cellulose is not particularly limited. From the viewpoint of availability and inexpensiveness, pulp is preferably used. Examples of the pulp include wood pulp, non-wood pulp, and deinked pulp. Examples of the wood pulp include chemical pulps such as leaf bleached kraft pulp (LBKP), needle bleached kraft pulp (NBKP), sulfite pulp (SP), dissolving pulp (DP), soda pulp (AP), unbleached kraft pulp (UKP), and oxygen bleached kraft pulp (OKP). Further, included are, but not particularly limited to, semichemical pulps such as semi-chemical pulp (SCP) and chemi-ground wood pulp (CGP); and mechanical pulps such as ground pulp (GP) and thermomechanical pulp (TMP, BCTMP). Examples of the non-wood pulp include, but are not particularly limited to, cotton pulps such as cotton linter and cotton lint; non-wood type pulps such as hemp, wheat straw, and bagasse; and cellulose isolated from ascidian, seaweed, etc., chitin, and chitosan. As a deinked pulp, there is deinked pulp using waste paper as a raw material, but it is not particularly limited thereto. The pulp of the present embodiment may be used singly, or in combination of two or more types. Among the above-listed pulp types, wood pulp and deinked pulp including cellulose are preferable from the viewpoint of easy availability. Among wood pulps, chemical pulp is preferable because it has a higher cellulose content to enhance the yield of ultrafine fibrous cellulose and decomposition of cellulose in the pulp is mild at the time of ultrafine fiber formation (defibration) to yield ultrafine fibrous cellulose having a long fiber length with a high aspect ratio. Among them, kraft pulp and sulfite pulp are most preferably selected.

The average fiber width of the ultrafine fibrous cellulose is 1000 nm or less according to observation with an electron microscope. The average fiber width is preferably 2 nm or more and 1000 nm or less, more preferably 2 nm or more and 100 nm or less, even more preferably 2 nm or more and 50 nm or less, and further preferably 2 nm or more and 10 nm or less, but is not particularly limited thereto. When the average fiber width of the ultrafine fibrous cellulose is less than 2 nm, since they are dissolved in water as cellulose molecules, there appears tendency that the physical properties (strength, rigidity, and dimensional stability) as ultrafine fibrous cellulose is not expressed sufficiently. The ultrafine fibrous cellulose is, for example, monofilament cellulose having a fiber width of 1000 nm or less.

The measurement of a fiber width of ultrafine fibrous cellulose by electron microscopic observation is carried out as follows. An aqueous suspension of ultrafine fibrous cellulose having a concentration of 0.05% by mass or more and 0.1% by mass or less is prepared, and the suspension is casted onto a hydrophilized carbon film-coated grid as a sample for TEM observation. If the sample contains wide fibers, SEM images of the surface of the suspension casted onto glass may be observed. The sample is observed using electron microscope images taken at a magnification of 1000×, 5000×, 10000×, or 50000× according to the widths of the constituent fibers. However, the sample, the observation conditions, and the magnification are adjusted so as to satisfy the following conditions:

(1) A single straight line X is drawn in any given portion in an observation image, and 20 or more fibers intersect with the straight line X.
(2) A straight line Y, which intersects perpendicularly with the aforementioned straight line in the same image as described above, is drawn, and 20 or more fibers intersect with the straight line Y.

The widths of the fibers intersecting the straight line X and the straight line Y in the observation image meeting the above-described conditions are visually read. 3 or more sets of images of surface portions, which are at least not overlapped, are thus observed, and the widths of the fibers intersecting the straight line X and the straight line Y are read in the each image. At least 120 fiber widths (20 fibers×2×3=120) are thus read. The average fiber width (which is simply referred to as a "fiber width" at times) of ultrafine fibrous cellulose is an average value of the fiber widths thus read.

The fiber length of the ultrafine fibrous cellulose is not particularly limited, and it is preferably 0.1 μm or more and 1000 μm or less, more preferably 0.1 μm or more and 800 μm or less, and particularly preferably 0.1 μm or more and 600 μm or less. By setting the fiber length within the above-described range, destruction of the crystalline region of the ultrafine fibrous cellulose can be suppressed, and the slurry viscosity of the ultrafine fibrous cellulose can also be set within an appropriate range. It is to be noted that the fiber length of the ultrafine fibrous cellulose can be obtained by an image analysis using TEM, SEM or AFM.

Ultrafine fibrous cellulose preferably has a type I crystal structure. In this regard, the fact that ultrafine fibrous cellulose has a type I crystal structure may be identified by a diffraction profile obtained from a wide angle X-ray diffraction photograph using CuKα ($\lambda$=1.5418 Å) monochromatized with graphite. Specifically, it may be identified based on the fact that there are typical peaks at two positions near 2θ=14° or more and 17° or less, and near 2θ=22° or more and 23° or less.

The percentage (crystallinity) of the type I crystal structure occupied in the ultrafine fibrous cellulose is not particularly limited in the present invention, and for example, it is preferably 30% or more, more preferably 50% or more, and further preferably 70% or more. In this case, more excellent performance can be expected, in terms of heat resistance and the expression of low linear thermal expansion. The crystallinity can be obtained by measuring an X-ray diffraction profile and obtaining it according to a common method (Seagal et al., Textile Research Journal, Vol. 29, p. 786, 1959).

The ultrafine fibrous cellulose of the present invention has phosphoric acid groups. In the present description, the "phosphoric acid group" includes a phosphoric acid group and a substituent derived from such a phosphoric acid group. The phosphoric acid group is a divalent functional group corresponding to phosphoric acid from which a hydroxyl group is removed. Specifically, it is a group represented by —PO$_3$H$_2$. The substituents derived from the phosphoric acid group include substituents, such as condensation-polymerized phosphoric acid groups, salts of phosphoric acid groups, and phosphoric acid ester groups, and they may be either ionic substituents or nonionic substituents.

In the present invention, the phosphoric acid group or a substituent derived from the phosphoric acid group may be a substituent represented by the following structural formula:

[Formula 1]

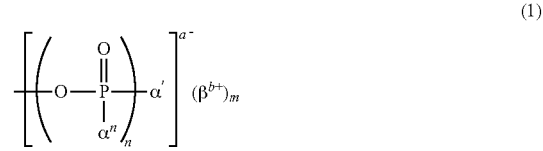

(1)

In the above structural formula, a, b, m and n each independently represent an integer of 1 or greater (provided that a=b×m); α and α' each independently represent R or OR. R is a hydrogen atom, a saturated straight chain hydrocarbon group, a saturated branched chain hydrocarbon group, a saturated cyclic hydrocarbon group, an unsaturated straight chain hydrocarbon group, an unsaturated branched chain hydrocarbon group, an aromatic group, or a derivative group thereof. β is a monovalent or higher valent cation consisting of organic matter or inorganic matter.

The amount of phosphoric acid groups in the ultrafine fibrous cellulose is preferably 1.00 mmol/g or more, more preferably 1.20 mmol/g or more, further preferably 1.65 mmol/g or more, and particularly preferably 1.80 mmol/g or more. On the other hand, the amount of phosphoric acid groups in the ultrafine fibrous cellulose is preferably 5.0 mmol/g or less. By setting the amount of phosphoric acid groups introduced within the above-described range, it may become easy to make the fiber raw material ultrafine, and the stability of the ultrafine fibrous cellulose can be enhanced. In addition, by making the amount of phosphoric acid groups introduced within the above-described range, although it is easy to fibrillate the fiber raw material, the hydrogen bonds between the ultrafine fibrous cellulose may also remain, and the expression of good strength can be expected.

The amount of phosphoric acid groups introduced may be measured by the aforementioned conductometric titration method. Specifically, the amount introduced may be measured by performing fibrillation on ultrafine fibers in the mechanical treatment step, treating the obtained ultrafine fibrous cellulose-containing slurry with an ion exchange resin, and then examining a change in the electrical conductivity while adding an aqueous sodium hydroxide solution.

The polymerization degree of the ultrafine fibrous cellulose is preferably 390 or more, and more preferably 400 or more. On the other hand, the polymerization degree of the ultrafine fibrous cellulose is preferably 1000 or less, and more preferably 450 or less. By setting the polymerization degree of the ultrafine fibrous cellulose within the above-described range, various types of properties exhibited by the ultrafine fibrous cellulose can be improved. For instance, when the ultrafine fibrous cellulose is processed into slurry, the obtained slurry has high transparency and high viscosity. When the ultrafine fibrous cellulose is processed into a sheet, the obtained sheet can exhibit excellent mechanical strength.

It is to be noted that the above-described polymerization degree of the ultrafine fibrous cellulose can be calculated by the same method as the aforementioned method of measuring the polymerization degree of the ultrafine fibrous cellulose obtained in the step (B).

As described above, in the step (A), when phosphoric acid groups are introduced into cellulose fibers to obtain phosphorylated cellulose fibers, if urea and/or a derivative thereof are used as a phosphorylating agent, as well as a compound having a phosphoric acid group, groups having a urethane bond is introduced as a group derived from such urea and/or a derivative thereof into cellulose. With regard to the amount of such groups having a urethane bond introduced into the ultrafine fibrous cellulose obtained in the present invention, the content of the groups having a urethane bond is preferably 0.3 mmol/g or less, more preferably 0.2 mmol/g or less, and further preferably 0.1 mmol/g or less, with respect to 1 g of the ultrafine fibrous cellulose. The content of the groups having a urethane bond may also be 0 mmol/g.

Besides, an example of the group having a urethane bond may be a group represented by the following structural formula:

[Formula 2]

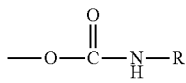

In the above structural formula, R represents a hydrogen atom, a saturated straight chain hydrocarbon group, a saturated branched chain hydrocarbon group, a saturated cyclic hydrocarbon group, an unsaturated straight chain hydrocarbon group, an unsaturated branched chain hydrocarbon group, an aromatic group, or a derivative group thereof.

The amount of the groups having a urethane bond introduced can be determined by measuring the amount of nitrogen covalently bound to cellulose. Specifically, after ionic nitrogen (ammonium ions) has been released and removed, the amount of nitrogen is measured according to a trace nitrogen analysis method. The release of ionic nitrogen (ammonium ions) is carried out under conditions where nitrogen covalently bound to cellulose is not substantially removed. The removal of the released ammonium ions is carried out by the same method as the measurement of the amount of phosphoric acid groups introduced. Specifically, the removal is carried out by adsorbing ammonium ions on a strongly acidic ion exchange resin.

In the trace nitrogen analysis, the measurement is carried out using the trace total nitrogen analyzer TN-110, manufactured by Mitsubishi Chemical Analytech Co., Ltd. Before performing the measurement, a solvent is removed by drying a sample at a low temperature (for example, at 40° C. for 24 hours in a vacuum dryer).

(Ultrafine Fibrous Cellulose-containing Slurry)

The present invention also relates to slurry containing fibrous cellulose with a fiber width of 1000 nm or less having phosphoric acid groups (hereinafter also referred to as "ultrafine fibrous cellulose-containing slurry). The viscosity at 25° C. of the ultrafine fibrous cellulose-containing slurry of the present invention is preferably 9500 mPa·s or more.

The viscosity of the ultrafine fibrous cellulose-containing slurry is the viscosity of slurry that is dispersed in ion exchange water so that the concentration of the ultrafine fibrous cellulose can be 0.4% by mass. The viscosity of the slurry is preferably 9500 mPa·s or more, more preferably 10000 mPa·s or more, and more preferably 12000 mPa·s or more. The upper limit value of the viscosity of the slurry is not particularly limited, and it can be, for example, 40000 mPa·s.

The viscosity of the ultrafine fibrous cellulose-containing slurry (concentration of the ultrafine fibrous cellulose: 0.4% by mass) can be measured using a type B viscometer (analog viscometer T-LVT, manufactured by BROOKFIELD). The viscosity is measured by rotating the dispersed solution under measurement conditions of 25° C. at a rotation number of 3 rpm for 3 minutes.

The haze of the ultrafine fibrous cellulose-containing slurry (concentration of the ultrafine fibrous cellulose: 0.2% by mass) is preferably 20% or less, more preferably 15% or less, and further preferably 10% or less. The haze of the ultrafine fibrous cellulose-containing slurry, which is within the above-described range, means that the ultrafine fibrous cellulose-containing slurry has high transparency and favorable fibrillation of the ultrafine fibrous cellulose. In such ultrafine fibrous cellulose-containing slurry, specific functions possessed by the ultrafine fibrous cellulose are exhibited.

Herein, the haze of the ultrafine fibrous cellulose-containing slurry (concentration of the ultrafine fibrous cellulose: 0.2% by mass) is a value measured by placing the ultrafine fibrous cellulose-containing slurry into a glass cell for liquid having an optical path length of 1 cm (MG-40, manufactured by Fujiwara Scientific Company Co., Ltd., inverse optical path), and then measuring the haze thereof using a haze meter (HM-150, manufactured by MURAKAMI COLOR RESEARCH LABORATORY Co., Ltd.) in accordance with JIS K 7136. It is to be noted that the measurement of zero point is carried out with ion exchange water filled in the same glass cell as that described above.

The yield of a supernatant obtained after the centrifugation of the ultrafine fibrous cellulose-containing slurry is preferably 50% or more, more preferably 70% or more, and further preferably 75% or more. The supernatant yield obtained after the centrifugation is used as an indicator of the yield of the ultrafine fibrous cellulose. The higher the supernatant yield, the higher the yield of the ultrafine fibrous cellulose that can be obtained.

Ion exchange water is added to the ultrafine fibrous cellulose-containing slurry, and the concentration of a solid thereof is then adjusted to 0.2% by mass to obtain slurry (defined as slurry A). Using a cooled high-speed centrifuge (H-2000B, KOKUSAN Co., Ltd.), the slurry A is centrifuged under conditions of 12000 G for 10 minutes. The obtained supernatant (defined as slurry B) is recovered, and the concentration of a solid in the supernatant is then measured. According to the following equation, a supernatant yield (the yield of the ultrafine fibrous cellulose) is obtained.

Supernatant yield (%)=(solid concentration (% by mass) of slurry B)/(solid concentration (% by mass) of slurry A)×100

(Ultrafine Fibrous Cellulose-containing Sheet)

The present invention relates to a sheet comprising fibrous cellulose with a fiber width of 1000 nm or less having phosphoric acid groups (hereinafter also referred to as an "ultrafine fibrous cellulose-containing sheet"). With regard to the ultrafine fibrous cellulose-containing sheet of the present invention, when the YI value obtained after performing vacuum drying on a sheet at 200° C. for 4 hours is defined as $YI_2$, and the YI value obtained before performing vacuum drying on a sheet at 200° C. for 4 hours is defined as $YI_1$, the $\Delta YI$ value represented by $YI_2-YI_1$ is preferably 20 or less. The $\Delta YI$ value indicates a change in yellowness before and after a heat treatment at 200° C., and the $\Delta YI$ value is more preferably 15 or less, and further preferably 10 or less. According to the present invention, the $\Delta YI$ value of the ultrafine fibrous cellulose-containing sheet can be reduced.

The YI value is an indicator that indicates the yellowness of a sheet. YI value is a value measured in accordance with JIS K 7373, using Colour Cute i (manufactured by Suga Test Instruments Co., Ltd.).

As mentioned above, a factor for suppressing a yellowness change in the ultrafine fibrous cellulose-containing sheet of the present invention is unknown. It is considered that suppression of such a yellowness change would be caused by a reduction in the amount of groups having a urethane bond contained in the ultrafine fibrous cellulose. That is to say, if groups having a urethane bond remain, nitrogen glycosides are generated as a result of thermal decomposition, and subsequently, an aminocarbonyl reaction, and then, a dehydration reaction from chain saccharides, etc. take place, and generation of coloring components is likely to increase. In the present invention, since the amount of groups having a urethane bond contained in the ultrafine fibrous cellulose is small, a yellowness change is considered to be suppressed.

The tensile strength of the ultrafine fibrous cellulose-containing sheet of the present invention is preferably 80 MPa or more, more preferably 90 MPa or more, and further preferably 100 MPa or more.

Herein, the tensile strength of the ultrafine fibrous cellulose-containing sheet of the present invention is a value measured by using a test piece that has been subjected to humidity control at a temperature of 23° C. and at a relative humidity of 50% for 24 hours, and employing the tension testing machine Tensilon (manufactured by A & D Company, Limited), in accordance with JIS K 8113.

The basis weight of the ultrafine fibrous cellulose-containing sheet of the present invention is preferably 10 g/m$^2$ or more, more preferably 20 g/m$^2$ or more, and further preferably 30 g/m$^2$ or more. On the other hand, the density of the ultrafine fibrous cellulose-containing sheet is preferably 60 g/m$^2$ or less. The basis weight of the sheet can be calculated in accordance with JIS P 8124.

The thickness of the ultrafine fibrous cellulose-containing sheet of the present invention is not particularly limited. It is preferably 5 μm or more, more preferably 10 μm or more, and further preferably 20 μm or more. The upper limit value of the sheet is not particularly limited, and it may be set, for example, at 1000 μm or less.

<Method for Producing Ultrafine Fibrous Cellulose-containing Sheet>

The step of producing a sheet includes a step of obtaining slurry containing fibrous cellulose having a fiber width of 1000 nm or less, a step of applying this slurry onto a base material, or a step of making a paper from the slurry. Among others, the step of producing a sheet preferably includes a step of applying slurry containing ultrafine fibrous cellulose (hereinafter also referred to simply as "slurry") onto a base material.

In the step of obtaining slurry, optional components such as antifoaming agents, lubricants, ultraviolet absorbing agents, dyes, pigments, stabilizers, and surfactants may be added into slurry. Examples of such optional components include hydrophilic polymers and organic ions. The hydrophilic polymers are preferably hydrophilic oxygen-containing organic compounds (except for the above-described cellulose fibers).

Oxygen-containing organic compounds may be added, as appropriate. Examples of the oxygen-containing organic compounds include: hydrophilic polymers, such as polyethylene glycol, polyethylene oxide, casein, dextrin, starches, modified starches, polyvinyl alcohol, modified polyvinyl alcohol (such as acetoacetylated polyvinyl alcohol), polyethylene oxide, polyvinyl pyrrolidone, polyvinyl methyl ether, polyacrylates, alkyl acrylate ester copolymers, urethane-based copolymers, and cellulose derivatives (such as hydroxyethyl cellulose, carboxyethyl cellulose, and carboxymethyl cellulose); and hydrophilic small molecules, such as glycerin, sorbitol, and ethylene glycol. Among these compounds, from the viewpoint of improving the strength, density, chemical resistance and the like of the fiber layer, oxygen-containing organic compounds are preferably polyethylene glycol, polyethylene oxide, glycerin and sorbitol, and more preferably at least one selected from polyethylene glycol and polyethylene oxide.

Examples of the organic ions include tetraalkylammonium ions and tetraalkylphosphonium ions. Examples of the tetraalkylammonium ions include a tetramethylammonium ion, a tetraethylammonium ion, a tetrapropylammonium ion, a tetrabutylammonium ion, a tetrapentylammonium ion, a tetrahexylammonium ion, a tetraheptylammonium ion, a tributylmethylammonium ion, a lauryltrimethylammonium ion, a cetyltrimethylammonium ion, a stearyltrimethylammonium ion, an octyldimethylethylammonium ion, a lauryldimethylethylammonium ion, a didecyldimethylammonium ion, a lauryldimethylbenzylammonium ion, and a tributylbenzylammonium ion. Examples of the tetraalkylphosphonium ions include a tetramethylphosphonium ion, a tetraethylphosphonium ion, a tetrapropylphosphonium ion, a tetrabutylphosphonium ion, and a lauryltrimethylphosphonium ion. In addition, tetrapropylonium ions and tetrabutylonium ions may include tetra-n-propylonium ions and tetra-n-butylonium ions, respectively.

<Coating Step>

The coating step is a step of applying slurry onto a base material, drying the slurry to form a sheet, and detaching the sheet from the base material to obtain a sheet. Use of a coating apparatus and a long base material can continuously produce sheets.

The quality of the base material used in the coating step is not particularly limited. Although a base material having higher wettability to the slurry is preferable because shrinkage of the sheet or the like upon drying is suppressed, it is preferable to select one from which a sheet formed after drying can be easily detached. Of these, a resin plate or a metal plate is preferable, without particular limitation.

Examples of the base material that can be used herein include resin plates such as acrylic plates, polyethylene terephthalate plates, vinyl chloride plates, polystyrene plates, and polyvinylidene chloride plates; metal plates such as aluminum plates, zinc plates, copper plates, and iron plates; plates obtained by the oxidation treatment of the surface thereof; and stainless steel plates and brass plates.

When the slurry has a low viscosity and spreads on the base material in the coating step, a damming frame may be fixed and used on the base material in order to obtain a sheet having a predetermined thickness and basis weight. The quality of the damming frame is not particularly limited, and it is preferable to select ones from which the edges of the sheet adhering after drying can be easily detached. Of these, frames formed from resin plates or metal plates are preferable, without particular limitation. Example of the frames that can be used herein include frames formed from resin plates such as acrylic plates, polyethylene terephthalate plates, vinyl chloride plates, polystyrene plates, and polyvinylidene chloride plates; from metal plates such as aluminum plates, zinc plates, copper plates, and iron plates; from plates obtained by the oxidation treatment of surface thereof; and from stainless steel plates and brass plates.

Examples of a coater for applying the slurry that can be used herein include roll coaters, gravure coaters, die coaters, curtain coaters, and air doctor coaters. Die coaters, curtain coaters, and spray coaters are preferable because more even thickness can be provided.

The coating temperature is not particularly limited, and it is preferably 20° C. or higher and 45° C. or lower, more preferably 25° C. or higher and 40° C. or lower, and further preferably 27° C. or higher and 35° C. or lower. When the coating temperature is equal to or higher than the above-described lower limit value, it is possible to easily apply the slurry. When the coating temperature is equal to or lower than the above-described upper limit value, it is possible to prevent volatilization of the dispersion medium upon coating.

In the coating step, it is preferable to apply the slurry so as to achieve a finished basis weight of the sheet of 10 g/m$^2$ or more and 100 g/m$^2$ or less, and preferably 20 g/m$^2$ or more and 60 g/m$^2$ or less. By applying the slurry so as to achieve a basis weight that is within the above-described range, a sheet having excellent strength can be obtained.

The coating step preferably includes a step of drying the slurry applied onto the base material. The drying method is not particularly limited, and any of a contactless drying method and a method of drying the sheet while locking the sheet may be used, or these methods may also be used in combination.

The contactless drying method is not particularly limited, and a method for drying by heating with hot air, infrared radiation, far-infrared radiation, or near-infrared radiation (a drying method by heating) or a method for drying in vacuum (a vacuum drying method) can be utilized. Although the drying method by heating and the vacuum drying method may be combined, the drying method by heating is usually utilized. The drying with infrared radiation, far-infrared radiation, or near-infrared radiation can be performed using an infrared apparatus, a far-infrared apparatus, or a near-infrared apparatus without particular limitations. The heating temperature for the drying method by heating is not particularly limited, and it is preferably 20° C. or higher and 150° C. or lower, and more preferably 25° C. or higher and 105° C. or lower. At the heating temperature equal to or higher than the above-described lower limit value, the dispersion medium can be rapidly volatilized. At the heating temperature equal to or lower than the above-described upper limit value, cost required for the heating can be reduced, and thermal discoloration of the ultrafine fibrous cellulose can be suppressed.

<Papermaking Step>

The step of producing the sheet of the present invention may include a step of papermaking from slurry. Examples of a paper machine used in the papermaking step include continuous paper machines such as a Fourdrinier paper machine, a cylinder paper machine, and an inclined paper machine, and a multilayer combination paper machine, which is a combination thereof. Known papermaking such as papermaking by hand may be carried out in the papermaking step.

In the papermaking step, the slurry is wire-filtered and dehydrated to obtain a sheet in a wet state. Then, the wet sheet is pressed and dried to obtain a sheet. Upon filtration and dehydration of the slurry, filter fabric for filtration is not particularly limited. It is important that ultrafine fibrous cellulose or polyamine polyamide epihalohydrin do not pass through the filter fabric and the filtration speed does not become excessively slow. Such filter fabric is not particularly limited, and a sheet comprising organic polymers, woven fabric, or porous membrane is preferred. Preferred examples of organic polymers include, but are not particularly limited to, non-cellulose organic polymers such as polyethylene terephthalate, polyethylene, polypropylene, and polytetrafluoroethylene (PTFE). Specific examples thereof include, but are not particularly limited to, a polytetrafluoroethylene porous membrane having a pore size of 0.1 μm or more and 20 μm or less, for example, 1 μm, and woven fabric made of polyethylene terephthalate or polyethylene having a pore size of 0.1 μm or more and 20 μm or less, for example, 1 μm.

A method for producing a sheet from slurry is not particularly limited, and an example thereof is a method of using the production apparatus disclosed in WO 2011/013567. This production apparatus comprises a dewatering section for ejecting slurry containing ultrafine fibrous cellulose onto the upper surface of an endless belt and then dewatering a dispersion medium contained in the ejected slurry to form a web, and a drying section for drying the web to produce a fiber sheet. The endless belt is provided across from the dewatering section to the drying section, and the web formed in the dewatering section is transferred to the drying section while being placed on the endless belt.

An adoptable dehydration method is not particularly limited. An example of the method is a dehydration method conventionally used for paper production. A preferred example is a method comprising performing dehydration using a Fourdrinier, cylinder, tilted wire, or the like and then performing dehydration using a roll press. In addition, a drying method is not particularly limited, and an example thereof is a method used for paper production and for example, a method using a cylinder dryer, a yankee dryer, hot air drying, a near-infrared heater, or an infrared heater is preferred.

(Composite Sheet)

The sheet of the present invention includes a composite sheet comprising a resin component in addition to ultrafine fibrous cellulose. The resin component may be, for example, a natural resin or a synthetic resin.

Examples of natural resins may include rosin-based resins, such as rosin, rosin ester and hydrogenated rosin ester.

The synthetic resin is preferably at least one selected from, for example, polycarbonate resins, polyethylene terephthalate resins, polyethylene naphthalate resins, polyethylene resins, polypropylene resins, polyimide resins, polystyrene resins and acrylic resins. Among them, the synthetic resin is preferably at least one selected from polycarbonate resins and acrylic resins, and more preferably a polycarbonate resin. It is to be noted that the acrylic resin is preferably at least any one selected from polyacrylonitrile and poly(meth)acrylate.

Examples of the polycarbonate resin include aromatic polycarbonate-based resins and aliphatic polycarbonate-based resins. These specific polycarbonate-based resins are known, and the polycarbonate-based resin described in JP-A-No. 2010-023275 is included, for example.

The aforementioned resin component may be present in a composite sheet, in a state in which it is uniformly dispersed, or may also be unevenly distributed in the composite sheet. That is to say, in the step of producing a composite sheet, slurry in which ultrafine fibrous cellulose and a resin component are uniformly mixed with each other may be obtained, and a composite sheet may be then formed from the slurry. Otherwise, a composite sheet having a laminated structure consisting of an ultrafine fibrous cellulose layer and a resin layer may also be formed.

(Intended Use)

With regard to ultrafine fibrous cellulose produced by the method for producing fibrous cellulose of the present invention, the amount of phosphoric acid groups introduced can be easily controlled, and the fibrillation thereof is favorably achieved. In addition, a sheet comprising the ultrafine fibrous cellulose has low yellowness (YI value). Even in the case of drying the sheet by heating it, an increase in the yellowness of the sheet is suppressed. From the viewpoint of making use of the above-described properties, the fibrous cellulose of the present invention is suitable for purposes such as various display devices, light transmissive substrates for various solar cells, and the like. Moreover, the fibrous cellulose of the present invention is suitable for purposes such as substrates for electronics, members for home electronics, window materials for various vehicles or buildings, interior materials, exterior materials, and packaging materials. Furthermore, the fibrous cellulose of the present invention is also suitable for purposes such as threads, filters, woven fabrics, buffering materials, sponges, polishing materials, and other purposes of using the sheet itself as a reinforcing material.

Furthermore, from the viewpoint of making use of other properties of the fibrous cellulose of the present invention, such as high viscosity of the ultrafine fibrous cellulose-containing slurry, the fibrous cellulose of the present invention can be used as a thickener for various intended uses (for example, as an additive or the like for food products, cosmetic products, cements, paints, inks, etc.).

EXAMPLES

Hereinafter, the features of the present invention will be described more specifically with reference to Examples and Comparative Examples. The materials, used amounts, proportions, treatment content, treatment procedures, and the like shown in the following Examples can be appropriately changed to the extent that such changes do not depart from the spirit of the present invention. Therefore, the scope of the present invention should not be construed as being limited by the following specific examples.

Example 1

<Phosphorylation Reaction Step>

As a leaf bleached kraft pulp serving as a raw material, a pulp manufactured by Oji Paper Co., Ltd. (sheet-like pulp having a solid content of 93% and a basis weight of 208 g/m$^2$, and a Canadian standard freeness (CSF) measured according to JIS P8121 after disintegration of 700 ml) was used. A mixed aqueous solution of ammonium dihydrogen phosphate and urea was added to 100 parts by weight of the above-described leaf bleached kraft pulp (absolute dry mass), and the resultant mixture was pressed to 48 parts by mass of ammonium dihydrogen phosphate, 130 parts by mass of urea and 165 parts by mass of ion exchange water, so as to obtain a chemical-impregnated pulp. The obtained chemical-impregnated pulp was dried and heat-treated for 200 seconds in a hot air dryer at 165° C. to introduce phosphoric acid groups into the cellulose in the pulp, so as to obtain phosphorylated cellulose fibers A.

<Washing and/or Alkaline Treatment Step>

Ion exchange water was poured onto the obtained phosphorylated cellulose fibers A, which was then uniformly dispersed by stirring, filtered, and dehydrated to obtain a dehydrated sheet. This operation was repeated to thoroughly wash off redundant chemicals. Subsequently, the dehydrated sheet was diluted with ion exchange water to cellulose fibers concentration of 2% by mass. A 1 N aqueous solution of sodium hydroxide was gradually added, while stirring, to obtain pulp slurry having pH 12±0.2. Then, this pulp slurry was dehydrated to obtain a dehydrated sheet. Then, ion exchange water was poured again onto the dehydrated sheet, which was then uniformly dispersed by stirring, filtered, and dehydrated to obtain a dehydrated sheet. This operation was repeatedly carried out to thoroughly wash off redundant sodium hydroxide, so as to obtain phosphorylated cellulose fibers B.

<Phosphoric Acid Group Introduction Step (Second Step)>

Using the obtained phosphorylated cellulose fibers B as a raw material, the aforementioned <phosphorylation reaction step> was repeatedly carried out, so that phosphoric acid groups were further introduced into the cellulose in the pulp, thereby obtaining phosphorylated cellulose fibers C.

<Crosslinking Step>

The obtained phosphorylated cellulose fibers C was heat-treated for 200 seconds in a hot air dryer at 165° C. to further introduce phosphoric acid groups into the cellulose in the pulp. At the same time, crosslinked structures were also introduced into the cellulose, mediated by the phosphoric acid groups, so as to obtain crosslinked phosphorylated cellulose fibers A.

It is to be noted that this crosslinking step was carried out, while the drying and/or heating time applied to the phosphoric acid group introduction step (second step) was prolonged (i.e., a heat treatment was carried out in a total of 400 seconds in a hot air dryer at 165° C.).

<Washing and/or Alkaline Treatment Step (Second Step)>

The aforementioned <washing and/or alkaline treatment step> was carried out on the obtained crosslinked phosphorylated cellulose fibers A to obtain crosslinked phosphorylated cellulose fibers B.

<Crosslink-breaking Step>

Ion exchange water and NaOH were added to the obtained crosslinked phosphorylated cellulose fibers B, so that the solid concentration of the crosslinked phosphorylated cellulose fibers B could be 2.0% by mass and the pH value thereof could be pH 12.5, thereby obtaining pulp slurry. The obtained pulp slurry was heated, while it was left at rest, under conditions of an internal temperature of 90° C. for 1 hour. Thereafter, this pulp slurry was dehydrated to obtain a dehydrated sheet. Ion exchange water was poured onto the dehydrated sheet again, was then uniformly dispersed by stirring, and was then filtered and dehydrated to obtain a dehydrated sheet. This operation was repeatedly carried out to thoroughly wash off redundant sodium hydroxide, so as to obtain crosslink-broken phosphorylated cellulose fibers A. The polymerization degree of the obtained crosslink-broken phosphorylated cellulose fibers A was measured by the after-mentioned method.

<Mechanical Treatment>

Ion exchange water was added to the obtained crosslink-broken phosphorylated cellulose fibers A to prepare a suspension having a solid concentration of 2.0% by mass. This suspension was subjected to a mechanical treatment using a wet-type atomizing device (ALTIMIZER, manufactured by Sugino Machine Ltd.) to obtain ultrafine fibrous cellulose-containing slurry. In the treatment using the wet-type atomizing device, ultrafine fibrous cellulose-containing slurry passed through the processing chamber once at a pressure of 200 MPa (for use in the measurement of supernatant yield, haze, viscosity, and urethane bond amount) and ultrafine fibrous cellulose-containing slurry passed through the processing chamber five times at a pressure of 200 MPa (for use in the measurement of phosphoric acid group amount and crosslinked structure amount) were obtained.

The obtained ultrafine fibrous cellulose-containing slurry was measured according to the after-mentioned methods, in terms of supernatant yield, haze, viscosity, the amount of urethane bonds, the amount of phosphoric acid groups, and the content of crosslinked structures.

<Sheet Formation>

Polyethylene glycol (molecular weight: 4,000,000; manufactured by Wako Pure Chemical Industries, Ltd.) was added to the ultrafine fibrous cellulose-containing slurry, such that 20 parts by mass of polyethylene glycol could be added to 100 parts by mass of the ultrafine fibrous cellulose. Moreover, ion exchange water was added to the slurry, such that a total solid concentration of the ultrafine fibrous cellulose and polyethylene glycol could be 0.5% by mass, and the obtained mixture was then stirred so that the solution could be fully uniform and the concentration could be adjusted, thereby obtaining a suspension. Thereafter, the suspension was weighed so that the finished basis weight of the sheet could be 45 g/m², was then developed on a commercially available acrylic plate, and was then dried in a chamber at 35° C. and a relative humidity of 15%. Here, a plate for damming was arranged on the acrylic plate so as to have a predetermined basis weight. According to the above-described procedures, an ultrafine fibrous cellulose-containing sheet was obtained, and the thickness thereof was 30 μm. The obtained ultrafine fibrous cellulose-containing sheet was measured according to the after-mentioned methods, in terms of tensile strength and YI values before and after heating.

Example 2

<Phosphorylation Reaction Step>

As a leaf bleached kraft pulp serving as a raw material, a pulp manufactured by Oji Paper Co., Ltd. (sheet-like pulp having a solid content of 93% and a basis weight of 208 g/m², and a Canadian standard freeness (CSF) measured according to JIS P8121 after disintegration of 700 ml) was used. A mixed aqueous solution of ammonium dihydrogen phosphate and urea was added to 100 parts by weight of the above-described leaf bleached kraft pulp (absolute dry mass), and the resultant mixture was pressed to 56 parts by mass of ammonium dihydrogen phosphate, 150 parts by mass of urea and 165 parts by mass of ion exchange water, so as to obtain a chemical-impregnated pulp. The obtained chemical-impregnated pulp was heated in a hot air dryer at 105° C., so that water was evaporated to carry out pre-drying. Thereafter, the chemical-impregnated pulp was dried and heat-treated for 30 minutes in a hot air dryer at 140° C. to introduce phosphoric acid groups into the cellulose in the pulp, so as to obtain phosphorylated cellulose fibers A.

<Crosslinking Step>

As described later, in the above-described <phosphorylation reaction step>, crosslinked structures were introduced into cellulose, mediated by the phosphoric acid groups. That is to say, the crosslinking step was carried out at the same time as the phosphorylation reaction step.

The <washing and/or alkaline treatment step>, <crosslink-breaking step>, and <mechanical treatment> were carried out in the same manner as that of Example 1, and thereafter, the polymerization degree of the obtained crosslink-broken phosphorylated cellulose fibers, and the supernatant yield, haze, viscosity, urethane bond amount, phosphoric acid group amount, crosslinked structure content of the obtained ultrafine fibrous cellulose-containing slurry, were measured according to the after-mentioned methods. Thereafter, the <sheet formation> was carried out in the same manner as that of Example 1, and the obtained ultrafine fibrous cellulose-containing sheet was measured according to the after-mentioned methods, in terms of tensile strength and YI values before and after heating.

Example 3

Crosslink-broken phosphorylated cellulose fibers, ultrafine fibrous cellulose-containing slurry, and an ultrafine fibrous cellulose-containing sheet were obtained in the same manner as that of Example 1, with the exception that the pH of the pulp slurry was adjusted to be pH 10 in the <crosslink-breaking step> of Example 1. With regard to the ultrafine fibrous cellulose-containing slurry, supernatant yield, haze, viscosity, the amount of urethane bonds, and the content of crosslinked structures were measured according to the after-mentioned methods. With regard to the ultrafine fibrous cellulose-containing sheet, tensile strength and YI values before and after heating were measured according to the after-mentioned methods.

Example 4

Crosslink-broken phosphorylated cellulose fibers, ultrafine fibrous cellulose-containing slurry, and an ultrafine fibrous cellulose-containing sheet were obtained in the same manner as that of Example 1, with the exceptions that HCl was used instead of NaOH and the pH of the pulp slurry was adjusted to be pH 4.0 in the <crosslink-breaking step> of Example 1. With regard to the ultrafine fibrous cellulose-containing slurry, supernatant yield, haze, viscosity, the amount of urethane bonds, and the content of crosslinked structures were measured according to the after-mentioned methods. With regard to the ultrafine fibrous cellulose-containing sheet, tensile strength and YI values before and after heating were measured according to the after-mentioned methods.

Comparative Example 1

Crosslink-broken phosphorylated cellulose fibers, ultrafine fibrous cellulose-containing slurry, and an ultrafine fibrous cellulose-containing sheet were obtained in the same manner as that of Example 1, with the exceptions that HCl was used instead of NaOH and the pH of the pulp slurry was adjusted to be pH 1.0 in the <crosslink-breaking step> of Example 1. With regard to the ultrafine fibrous cellulose-containing slurry, supernatant yield, haze, viscosity, the amount of urethane bonds, and the content of crosslinked structures were measured according to the after-mentioned methods. With regard to the ultrafine fibrous cellulose-containing sheet, tensile strength and YI values before and after heating were measured according to the after-mentioned methods.

Comparative Example 2

Phosphorylated cellulose fibers, ultrafine fibrous cellulose-containing slurry, and an ultrafine fibrous cellulose-containing sheet were obtained in the same manner as that of Example 1, with the exceptions that the heating time in the <crosslinking step> was set at 80 seconds, and further that the <crosslink-breaking step> was not carried out. With regard to the ultrafine fibrous cellulose-containing slurry, supernatant yield, haze, viscosity, the amount of urethane bonds, and the content of crosslinked structures were measured according to the after-mentioned methods. With regard to the ultrafine fibrous cellulose-containing sheet, tensile strength and YI values before and after heating were measured according to the after-mentioned methods.

Comparative Example 3

Phosphorylated cellulose fibers, ultrafine fibrous cellulose-containing slurry, and an ultrafine fibrous cellulose-containing sheet were obtained in the same manner as that of Example 1, with the exception that the <crosslink-breaking step> was not carried out. With regard to the ultrafine fibrous cellulose-containing slurry, supernatant yield, haze, viscosity, the amount of urethane bonds, and the content of crosslinked structures were measured according to the after-mentioned methods. With regard to the ultrafine fibrous cellulose-containing sheet, tensile strength and YI values before and after heating were measured according to the after-mentioned methods.

Reference Example

Phosphorylated cellulose fibers, ultrafine fibrous cellulose-containing slurry, and an ultrafine fibrous cellulose-containing sheet were obtained in the same manner as that of Example 1, with the exception that the <crosslinking step> and <crosslink-breaking step> were not carried out. With regard to the ultrafine fibrous cellulose-containing slurry, supernatant yield, haze, viscosity, the amount of urethane bonds, and the content of crosslinked structures were measured according to the after-mentioned methods. With regard to the ultrafine fibrous cellulose-containing sheet, tensile strength and YI values before and after heating were measured according to the after-mentioned methods.
(Analysis and Evaluation)
<Measurement of Supernatant Yield>

With regard to the ultrafine fibrous cellulose-containing slurry, a supernatant yield after completion of centrifugation was measured according to the following method. The supernatant yield obtained after the centrifugation is used as an indicator of the yield of the ultrafine fibrous cellulose. The higher the supernatant yield, the higher the yield of the ultrafine fibrous cellulose that can be obtained.

Ion exchange water was added to the ultrafine fibrous cellulose-containing slurry, and the concentration of a solid thereof was then adjusted to 0.2% by mass to obtain slurry (defined as slurry A). Using a cooled high-speed centrifuge (H-2000B, KOKUSAN Co., Ltd.), the slurry A was centrifuged under conditions of 12000 G for 10 minutes. The obtained supernatant (defined as slurry B) was recovered, and the concentration of a solid in the supernatant was then measured. According to the following equation, a supernatant yield (the yield of the ultrafine fibrous cellulose) was obtained.

Supernatant yield(%)=(solid concentration(% by mass)of slurry B)/(solid concentration(% by mass)of slurry A)×100

<Haze of Slurry>

Haze is a scale of the transparency of the ultrafine fibrous cellulose-containing slurry. The lower the haze value, the higher the transparency that can be achieved.

The haze of the ultrafine fibrous cellulose-containing slurry was measured by diluting the ultrafine fibrous cellulose-containing slurry after completion of the mechanical treatment step (fibrillation step) with ion exchange water to a concentration of 0.2% by mass, then placing the ultrafine fibrous cellulose-containing slurry into a glass cell for liquid having an optical path length of 1 cm (MG-40, manufactured by Fujiwara Scientific Company Co., Ltd., inverse optical path), and then measuring the haze thereof using a haze meter (HM-150, manufactured by MURAKAMI COLOR RESEARCH LABORATORY Co., Ltd.) in accordance with JIS K 7136. It is to be noted that the measurement of zero point was carried out with ion exchange water filled in the same glass cell as that described above.

<Measurement of Amount of Phosphoric Acid Groups Introduced>

The amount of phosphoric acid groups introduced was measured by a conductometric titration method. Specifically, fibrillation was carried out by a mechanical treatment step (fibrillation step), the obtained ultrafine fibrous cellulose-containing slurry was then treated with an ion exchange resin, and a change in the electrical conductivity was then obtained while adding a sodium hydroxide aqueous solution, thereby measuring the amount of phosphoric acid groups introduced.

In the treatment with an ion exchange resin, 1/10 by volume of a strongly acidic ion exchange resin (Amberjet 1024: conditioning agent, manufactured by Organo Corporation) was added to slurry containing 0.2% by mass of the ultrafine fibrous cellulose, and the resultant mixture was then shaken for 1 hour. Then, the mixture was poured onto a mesh having 90 μm-apertures to separate the resin from the slurry. In the alkali titration, the change in the electric conductivity value indicated by the dispersion was measured while adding a 0.1 N aqueous solution of sodium hydroxide to the slurry containing fibrous cellulose after the ion exchange.

This conductometric titration confers a curve shown in FIG. 1 as an alkali is added. First, the electrical conductivity is rapidly reduced (hereinafter, this region is referred to as a "first region"). Then, the conductivity starts rising slightly (hereinafter, this region is referred to as a "second region").

Then, the increment of the conductivity is increased (hereinafter, this region is referred to as a "third region"). In short, three regions appear. Besides, the boundary point between the second region and the third region is defined as a point at which the secondary differential value of conductivity, that is, the change in the increment (gradient) of conductivity becomes maximum. Among them, the amount of the alkali required for the first region among these regions is equal to the amount of a strongly acidic group in the slurry used in the titration, and the amount of the alkali required for the second region is equal to the amount of a weakly acidic group in the slurry used in the titration.

The amount (mmol) of the alkali required for the first region in the curve shown in FIG. 1 was divided by the solid content (g) in the dispersion as a titration target to obtain the amount of the first dissociation alkali (mmol/g), and this amount was defined as the amount of phosphoric acid groups introduced.

<Measurement of Amount of Crosslinked Structures>

It is considered that the crosslinked structures are formed as a result of dehydration condensation performed by phosphoric acid groups that have been introduced into cellulose fibers. That is, it is a structure in which a glucose unit of cellulose binds to each of two P atoms of pyrophosphoric acid via an O atom. Accordingly, if crosslinked phosphoric acid groups are formed, weakly acidic groups are apparently lost, and as a result, the amount of alkali necessary for the second region is reduced in comparison to the amount of alkali necessary for the first region in FIG. 1. That is, the amount of the crosslinked structures are equal to a value obtained by dividing a difference between the amount of alkali necessary for the first region (first dissociation alkali amount) and the amount of alkali necessary for the second region (second dissociation alkali amount) by 2.

<Method of Measuring Viscosity of Ultrafine Fibrous Cellulose-containing Slurry>

The ultrafine fibrous cellulose-containing slurry was diluted to a solid concentration of 0.4% by mass, and was then stirred using a disperser at 1500 rpm for 5 minutes. The viscosity of the obtained slurry was measured using a type B viscometer (analog viscometer T-LVT, manufactured by BROOKFIELD). The measurement conditions were set to be 3 rpm and 25° C.

<Measurement of Content of Groups Having a Urethane Bond (Trace Nitrogen Analysis Method)>

The content of the groups having a urethane bond was determined by measuring the amount of nitrogen covalently bound to cellulose. Specifically, after ionic nitrogen (ammonium ions) had been released and removed, the amount of nitrogen was measured according to a trace nitrogen analysis method. The release of ionic nitrogen (ammonium ions) was carried out under conditions where nitrogen covalently bound to cellulose was not substantially removed. The removal of the released ammonium ions was carried out by the same method as the measurement of the amount of phosphoric acid groups introduced. Specifically, the removal was carried out by adsorbing ammonium ions on a strongly acidic ion exchange resin.

In the trace nitrogen analysis, the measurement was carried out using the trace total nitrogen analyzer TN-110, manufactured by Mitsubishi Chemical Analytech Co., Ltd. Before performing the measurement, a solvent was removed by drying a sample at a low temperature (for example, at 40° C. for 24 hours in a vacuum dryer).

<Measurement of Polymerization Degree>

The polymerization degree of the ultrafine fibrous cellulose was calculated from the viscosity of pulp, which had been measured according to Tappi T230. Specifically, the ultrafine fibrous cellulose as a measurement target was dispersed in a dispersion medium, and the viscosity thereof was then measured (defined as $\eta 1$). At the same time, a blank viscosity (defined as $\eta 0$) was measured using only a dispersion medium. Thereafter, a specific viscosity ($\eta sp$) and an intrinsic viscosity ($[\eta]$) were measured according to the following equations.

$$\eta sp = (\eta 1/\eta 0) - 1$$

$$[\eta] = \eta sp/(c(1 + 0.28 \times \eta sp))$$

In the above equation, c indicates the concentration of the ultrafine fibrous cellulose at the time of measuring the viscosity.

Then, the polymerization degree (DP) was calculated according to the following equation.

$$DP = 1.75 \times [\eta]$$

Since this polymerization degree is an average polymerization degree measured according to viscometry, it is also referred to as a "viscosity average polymerization degree."

<Tensile Properties of Sheet>

The tensile strength and the tensile elastic modulus of the ultrafine fibrous cellulose-containing sheet were measured in accordance with JIS P 8113, using a tensile tester Tensilon (manufactured by A & D Co., Ltd.). For the measurement under humidity-controlled conditions, a test piece was prepared by humidity conditioning for 24 hours at 23° C. and a relative humidity of 50%.

<Yellowness Before and After Heating>

In accordance with JIS K 7373, yellowness (YI) before and after the heating of the ultrafine fibrous cellulose-containing sheet was measured, using Colour Cute i (manufactured by Suga Test Instruments Co., Ltd.).

It is to be noted that heating conditions were set to be 200° C., 4 hours, and vacuum drying.

<Yellowness Change>

The yellowness change ($\Delta YI$) of the sheet is represented by the following equation:

$$\Delta YI = YI_2 - YI_1$$

Herein, $YI_1$ indicates yellowness before performing vacuum drying at 200° C. for 4 hours, and $YI_2$ indicates yellowness after performing vacuum drying at 200° C. for 4 hours. Yellowness is a value measured in accordance with JIS K 7373.

TABLE 1

Amount of phosphoric acid groups/crosslink structures

| | Conditions for step (B) | | After step (A) | | | After step (B) | | | Cross-linking breaking percentage (%) in step (B) | Amount of phosphoric acid groups after step (C) [mmol/g] | Supernatant yield [%] | Haze of slurry [%] | Viscosity of slurry [mPa·s] |
|---|---|---|---|---|---|---|---|---|---|---|---|---|---|
| | Crosslink-breaking treatment | pH | Amount of phosphoric acid groups [mmol/g] | Amount of alkali of first dissociation (amount of alkali of second dissociation) [mmol/g] | Crosslinked structures [mmol/g] | Amount of phosphoric acid groups [mmol/g] | Amount of alkali of first dissociation (amount of alkali of second dissociation) [mmol/g] | Crosslinked structures [mmol/g] | | | | | |
| Ex. 1 | Yes | 12.5 | 2.14 | 1.82 | 0.160 | 1.72 | 1.69 | 0.015 | 90.6 | 1.72 | 82.3 | 8.0 | 22500 |
| Ex. 2 | | 12.5 | 1.58 | 0.93 | 0.325 | 1.31 | 1.20 | 0.055 | 83.1 | 1.31 | 57.3 | 19.8 | 13160 |
| Ex. 3 | | 10.0 | 2.14 | 1.82 | 0.160 | 1.82 | 1.70 | 0.060 | 62.5 | 1.82 | 75.5 | 9.9 | 19170 |
| Ex. 4 | | 4.0 | 2.14 | 1.82 | 0.160 | 1.70 | 1.69 | 0.005 | 96.9 | 1.70 | 88.9 | 7.2 | 10430 |
| Comp. Ex. 1 | | 1.0 | 2.14 | 1.82 | 0.160 | 1.60 | 1.60 | 0.000 | 100 | 1.60 | 90.6 | 7.2 | 5760 |
| Comp. Ex. 2 | No | — | 1.74 | 1.63 | 0.055 | — | — | — | — | 1.74 | 40.1 | 34.6 | 9210 |
| Comp. Ex. 3 | | — | 2.14 | 1.82 | 0.160 | — | — | — | — | 2.14 | 6.2 | 64.3 | <1000 |
| Ref. Ex. | | — | 1.62 | 1.59 | 0.015 | — | — | — | — | 1.62 | 74.4 | 10.9 | 18040 |

TABLE 2

| | Amount of urethane bonds [mmol/g] | Polymerization degree | | | DPb/DPa | Tensile strength [MPa] | ΔYI [—] |
|---|---|---|---|---|---|---|---|
| | | DPa | DPb | DPc | | | |
| Ex. 1 | 0.004 | 941 | 840 | 426 | 0.89 | 118 | 10.8 |
| Ex. 3 | 0.031 | 941 | 862 | 433 | 0.92 | 113 | 9.4 |
| Ex. 4 | 0.368 | 941 | 731 | 404 | 0.78 | 94 | 18.0 |
| Comp. Ex. 1 | 0.342 | 941 | 587 | 387 | 0.62 | 73 | 20.6 |
| Comp. Ex. 2 | 0.201 | 941 | Non-measurable | Non-measurable | — | 100 | 17.4 |
| Comp. Ex. 3 | 0.411 | 941 | Non-measurable | Non-measurable | — | 65 | 19.9 |
| Ref. Ex. | 0.135 | 941 | 890 | 459 | 0.95 | 108 | 19.1 |

In the Examples, the yield of the ultrafine fibrous cellulose was high. In addition, in the Examples, the obtained ultrafine fibrous cellulose-containing slurry had high transparency and high viscosity. Moreover, in the Examples, yellowness was suppressed in the obtained ultrafine fibrous cellulose-containing sheets.

With regard to the polymerization degree shown in Table 2, in the Comparative Examples with the term "non-measurable," pulp and ultrafine fibrous cellulose were not dissolved in a dispersion medium (copper ethylenediamine aqueous solution) upon the measurement of viscosity average polymerization degree. It is assumed that this is because cellulose is not dissolved in a branched chain state due to excessively formed crosslinked structures.

The invention claimed is:

1. Fibrous cellulose having a fiber width of 1000 nm or less, which have phosphoric acid groups, wherein
   the amount of the phosphoric acid groups in the fibrous cellulose is 1.65 mmol/g or more, and the polymerization degree of the fibrous cellulose is 390 or more, the content of groups having a urethane bond is 0.3 mmol/g or less, and
   the fibrous cellulose comprise crosslinked structures formed via the phosphoric acid groups.

2. A slurry comprising the fibrous cellulose according to claim 1.

3. The slurry according to claim 2, having a viscosity at 25° C. of 9500 mPa·s or more.

4. A sheet comprising the fibrous cellulose according to claim 1.

5. The sheet according to claim 4, wherein when the YI value obtained after the sheet is dried in vacuum at 200° C. for 4 hours is defined as $YI_2$, and the YI value obtained before the sheet is dried in vacuum at 200° C. for 4 hours is defined as $YI_1$, the ΔYI value represented by $YI_2-YI_1$ is 20 or less.

* * * * *